INVENTOR.
JOHN M. ERICKSON
BY Ernest J Weinberger
Lori B. Appleton
ATTORNEYS

INVENTOR.
JOHN M. ERICKSON

United States Patent Office 3,532,959
Patented Oct. 6, 1970

3,532,959
VOLTAGE REVERSAL CONCELLATION ON SERIES CONNECTED CAPACITORS
John M. Erickson, Asbury Park, N.J., assignor to the United States of America as represented by the Secretary of the Navy
Filed Aug. 19, 1968, Ser. No. 753,630
Int. Cl. H02m 3/18
U.S. Cl. 320—1         6 Claims

ABSTRACT OF THE DISCLOSURE

Protective circuit for the elimination of voltage reversal on energy storage capacitors in an oscillatory discharge. A pair of identical capacitors are connected in series across a load, and back-to-back diodes are connected at their junction between the capacitors and disposed on the source side of the capacitors. A switch is in series with the load so as to discharge one of the capacitors therethrough. This switch takes the form of a bidirectional device when multicycle continuous operation is contemplated.

FIELD OF THE INVENTION

The present invention relates to a capacitance charging circuit and more particularly to a circuit for minimizing the voltage reversal on the storage capacitor in such an oscillatory discharge.

DESCRIPTION OF THE PRIOR ART

Various methods and circuits have been suggested to reduce the percentage of voltage reversal in storage capacitors subject to oscillatory discharges. It has been the general practice to employ what is commonly referred to as "crowbarring." This effectively relies on short circuiting the discharge shortly or immediately after peak current has been attained. Such methods have proved to be unsatisfactory in several regards. They are limited or applicable to only one half-cycle of the oscillatory discharge, and the waveshape of the resulting discharge current is an extremely distorted sine wave. These limitations are overcome by the present invention.

SUMMARY OF THE INVENTION

This invention provides a circuit for the elimination of voltage reversal on storage capacitors subject to oscillatory discharge, avoiding the disadvantages of the prior art. To attain this, the present invention provides a unique arrangement of diodes across a pair of storage capacitors in conjunction with a series load control switch.

An object of the present invention is to provide a simple, inexpensive and reliable circuit having a minimum of components for the elimination of voltage reversal on storage capacitors subjected to an oscillatory discharge and applicable for both half-cycle and multi-cycle operation.

BRIEF DESCRIPTION OF THE DRAWINGS

Other objects and many of the attendant advantages of this invention will be readily appreciated as the same becomes better understood by reference to the following detailed description when considered in connection with the accompanying drawings, in which like reference numerals designate like parts throughout the figures thereof and wherein.

DESCRIPTION OF THE PREFERRED EMBODIMENTS

Figure 1:
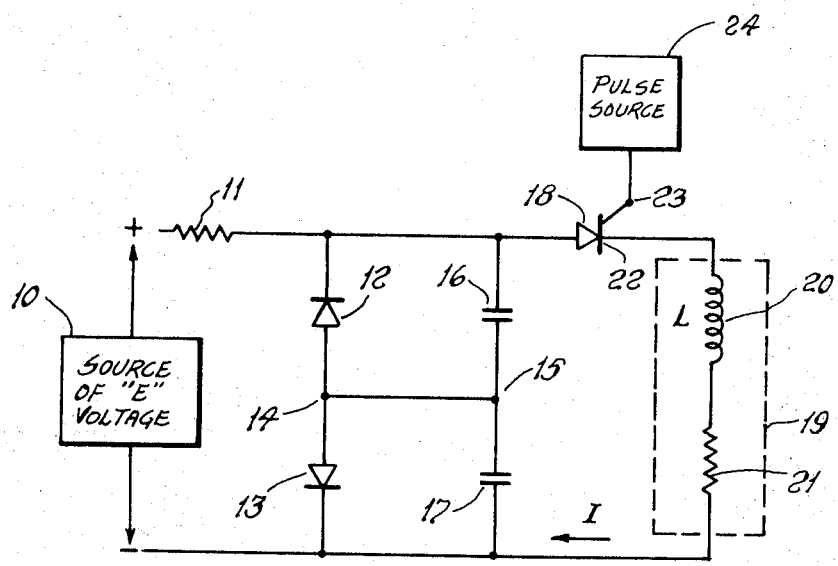
FIG. 1 is a schematic wiring diagram of an embodiment made in accordance with the principle of this invention for half-cycle oscillatory discharge.

In the illustrated embodiment of FIG. 1 a charging current is supplied by a source 10 through a charging resistor 11 and across a pair of back-to-back diodes 12 and 13. The juncture 14 between the diodes is connected to the junction 15 between a pair of identical capacitors 16 and 17. One of the capacitors namely 16 is the energy storage capacitor. Connected across the capacitors is the series combination of a controlled rectifier 18 and a load 19 which under the worst conditions would comprise an inductance 20 and a resistance 21. The rectifier is of the controllable variety commonly referred to as a silicon controlled rectifier. Its construction is similar to the PNPN diode except that an ohmic connection is made to the isolated P region. The insertion of a pulse of current into this region causes the device to switch from its high impedance "off" state to a very low impedance "on" state, thus allowing control of current, much as a thyratron. The cathode electrode 22 is connected to the load side while the gate 23 receives a current pulse from a source 24 to control the discharge.

Capacitor 16 is charged to the supply voltage E in series with the diode 13 and resistor 11. At the completion thereof, the controlled rectifier 18 is gated on by a pulse from source 24 causing the storage capacitor 16 to discharge around the series path including rectifier 18, inductance 20, resistance 21, capacitor 17 and diode 12. Diode 12 prevents voltage reversal across the storage capacitor 16 during the charging of capacitor 17 (discharge of capacitor 16).

Figure 2:
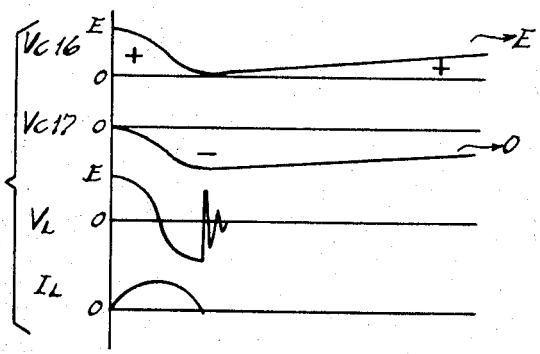
FIG. 2 is a graphic representation of the voltage and current in various components of the embodiment in FIG. 1.

FIG. 2 illustrates the waveforms which exist in the circuit during the half-cycle oscillatory discharge. Just prior to the instant, controlled rectifier is turned "on" the voltage Vc16 across the energy storage capacitor is E and this decreases to almost zero but never reverses polarity and then commences to charge again. The voltage Vc17 is initially zero since this capacitor is uncharged and with the discharge of the storage capacitor, charges to a negative potential of E and thereafter approaches the uncharged state.

The voltage across the inductor L starts at E or equal to the storage capacitor. The voltage then goes through a complete half cycle followed by a period of highly damped oscillations which depend on the value of resistor 21. The load current, as illustrated, pass through only the positive half cycle without and reversal.

Figure 3:
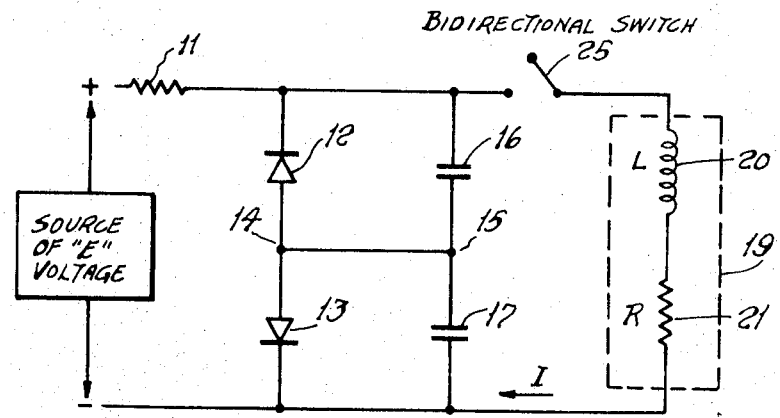
FIG. 3 is a schematic wiring diagram of another embodiment operable for multi-cyclic continuous oscillatory discharge; and, FIG. 4 is a graphic representation of the voltage and current in various components of the embodiment of FIG. 3.
Figure 4:
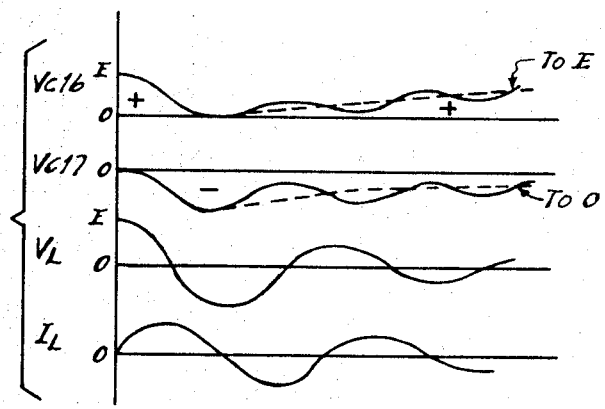

In the multicycle continuous case, FIG. 3, the circuit is identical to that shown in FIG. 1, except that the silicon controlled rectifier has been replaced by a bi-directional switch, which is represented by a conventional single pole single throw switch 25. The storage capacitor 16 is initially charged to the voltage E+. The bidirectional switch is then closed so that this capacitor discharges through the path including inductor 20, resistor 21, capacitor 17 and diode 12, whose impedance is far less than that of the condenser. Since the switch is not opended at the end of a half cycle, the current in this loop is in the form of a damped oscillation. The capacitor 17 at the end of the first half cycle charges to a negative potential of E, and the storage capacitor is fully discharged. Thereafter the storage capacitor 16 slowly charges toward E+ while capacitor 17 discharges slowly toward zero potential, both following an oscillatory waveform.

It is apparent that there is no voltage reversal on either of the capacitors.

With the elimination of voltage reversal in the oscillatory discharge circuit, the expected life of the capacitor package is increased without any sacrifice in the oscillatory discharge waveform. Of special note is the fact that, where high current pulse discharge is encountered, as in generators employed for the evaluation of semiconductor devices, the extended life imparted by this invention to the storage capacitor permits extensive reliable and repeatable tests.

It should be understood, of course, that the foregoing disclosure relates to only preferred embodiments of the invention and that numerous modifications or alterations may be made therein without departing from the spirit and the scope of the invention as set forth in the appended claims.

I claim:
1. A circuit for the elimination of voltage reversal in a storage capacitor comprising:
   a pair of unidirectional conduction elements connected back-to-back;
   a pair of identical capacitors connected in series with their common junction connected to the junction of said unidirectional elements;
   means connecting respectively the free ends of said elements and capacitors;
   a switch means;
   a load; and
   an electrical connection forming a series path including said switch means and said load across said ends of said elements and capacitors;
   a source of voltage connected directly across said back-to-back elements;
   whereby the potential across each of said capacitors will maintain the same polarity.

2. The circuit according to claim 1 further including a resistive component interposed between said source and one of said elements.

3. The circuit according to claim 2 wherein said elements are semiconductor diodes.

4. The circuit according to claim 3 wherein said load is inductive.

5. The circuit according to claim 4 wherein said switch means is a unidirectional silicon controlled rectifier and further including a controlled pulse source connected thereto for actuating said rectifier.

6. The circuit according to claim 5 wherein said switch means is a bidirectional switch.

References Cited

UNITED STATES PATENTS 2,710,365   6/1955   MacDougall et al. __ 317—151 X

TERRELL W. FEARS, Primary Examiner

U.S. Cl. X.R.

307—108